United States Patent [19]

Warner, Jr.

[11] 4,166,896

[45] Sep. 4, 1979

[54] POLYESTER PRODUCTION

[75] Inventor: Kenneth N. Warner, Jr., Newark, Ohio

[73] Assignee: Owens-Corning Fiberglas Corporation, Toledo, Ohio

[21] Appl. No.: 808,848

[22] Filed: Jun. 22, 1977

Related U.S. Application Data

[63] Continuation of Ser. No. 660,100, Feb. 23, 1976, abandoned, and a continuation-in-part of Ser. No. 544,453, Jan. 27, 1975, abandoned.

[51] Int. Cl.$^2$ .............................................. C08G 63/56
[52] U.S. Cl. .................................... 528/301; 528/304; 525/444
[58] Field of Search ...................... 260/75 UA, 75 M; 528/301, 304

[56] References Cited

U.S. PATENT DOCUMENTS

| | | | |
|---|---|---|---|
| 2,793,235 | 5/1957 | Jenkinson | 260/75 M |
| 3,160,679 | 12/1964 | Lew | 260/75 UA |
| 3,252,941 | 5/1966 | Mayer et al. | 260/75 M |
| 3,442,868 | 5/1969 | Ogata et al. | 260/75 M |
| 3,836,574 | 9/1974 | Achsel et al. | 260/75 M |

*Primary Examiner*—Walter C. Danison
*Attorney, Agent, or Firm*—Ronald C. Hudgens; Philip R. Cloutier; James B. Wilkens

[57] ABSTRACT

I disclose thermosetting unsaturated polyesters which I produce from a mixture of glycols and oligomers. The mixture is a waste stream from a process for the production of linear polyesters from glycols and terephthalic acid. Prior to this invention, the waste stream had to be burned or buried. Now I can make useful polyester resins from them.

5 Claims, No Drawings

POLYESTER PRODUCTION

This is a continuation of application Ser. No. 660,100, filed Feb. 23, 1976, now abandoned and a continuation-in-part of application Ser. No. 544,453 filed Jan. 27, 1975 now abandoned.

This invention relates to unsaturated polyesters.

The preparation of linear polyesters of glycols and terephthalic acid by ester exchange and condensation is well known. U.S. Pat. Nos. 2,465,319; 2,727,881; and 3,488,382 and many others describe such processes in great detail. Polyethylene terephthalate and polybutylene terephthalate are typical of the polyesters industry produces. These polyesters have found widespread use in the manufacture of films, fibers, and molding compounds.

These processes for the production of linear polyesters often produce a waste stream. Most manufacturers remove ethylene glycol from these streams and then bury or burn the remains. In some cases these remains are a mixture of glycols and oligomers. Oligomer, as I use it in my invention, means a low molecular weight polyester of terephthalic acid and one or more glycols. It is this mixture which I use to produce the thermosetting, unsaturated polyesters resins of this invention.

It is essential that the properties of polyesters be consistent from batch to batch. The waste streams that I use in my invention, however, vary widely from batch to batch. My incorporating them unchanged into the backbone of higher molecular weight polyester resins would result in blocking. That is, the resulting polyester resin would contain polymer segments having repeating acid-glycol units adjacent to each other rather than a random distribution of all acid-glycol units along the polymer backbone. Blocking results in undesired variations in properties.

Accordingly, I produce the thermosetting, unsaturated polyester by first depolymerizing the mixture of glycols and oligomers. I do this by heating (first cook) the mixture of glycols and oligomers to break up the oligomers by transesterification (depolymerization). The addition of ethylenically unsaturated dicarboxylic acids or their anhydrides and a second cook follow the first cook. By breaking up the oligomers in the first cook, I minimize viscosity drift in the resulting unsaturated resin during storage.

I add the additional glycol that I employ to either the first or second cook or both if necessary. The same is true for any saturated acid that I employ.

In another embodiment, I first heat the waste stream in the first cook to transesterify the oligomers, add additional glycol during a second cook and then follow with the addition of unsaturated acid in a third cook. Again, I can add additional glycols or saturated acids to any one of the three stages of cook.

I desired, I can add a catalyst to the first stage of either the two or three stage cook. The important step is to break up the oligomers in the transesterification step before adding the unsaturated acid.

The mixture of glycols and oligomers and any additional saturated dicarboxylic acids and glycols are charged to a reactor; and the reaction generally is carried out at a temperature ranging from 170° to 235° C., at a pressure ranging from 0 to 60 psi and for a time ranging from 2 to 24 hours. The reaction is continued until the starting acid number is at least halved, but preferably to a range of 5 to 10.

The ethylenically unsaturated dicarboxylic acids then are charged to the reactor with any additional saturated acid or glycols; and the reaction is carried out at a temperature ranging from 170° to 220° C., at a pressure ranging from 0 to 60 psi for the additional time required to reduce the acid number below about 35.

The mixture of glycols and oligomers which I can use to produce my polyesters will have the following analyses.

| Composition | Composition, Weight Percent | |
|---|---|---|
| | Range | Preferred |
| Ethylene glycol | 0–25 | 4–10 |
| Diethylene glycol | 0–10 | 3–7 |
| Triethylene glycol | 0–5 | 0–3 |
| Ethylene glycol monomer | 12–40 | 14–30 |
| Diethylene glycol monomer | 0–15 | 2–12 |
| Mixed monomers | 0–15 | 5–13 |
| Oligomers of polyethylene terephthalate | 15–70 | 40–65 |

The mixture will have a hydroxyl number within the range of from about 250 to about 1000 with a preferred range being from about 250 to 650.

In the above mixture, the monomers and the oligomers can be considered as having the following formulas:

Ethylene glycol monomer

Diethylene glycol monomer

Mixed monomers

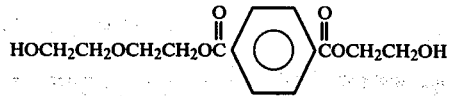

Oligomers

-continued

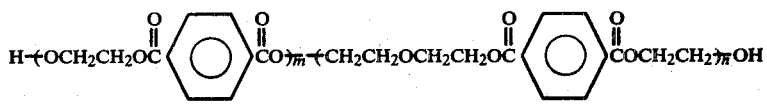

wherein m is, generally, greater than n and wherein the sum of m plus n is within the range of from 2 to 4.

Mixtures of glycols and oligomers such as desribed above are commercially available.

Small amounts of compounds of inorganic metals such as titanium, zinc, lead, calcium, antimony, manganese, and the like also are present in the mixture. These metal compounds are residue from the catalysts employed in the various polyester processes.

The dicarboxylic acids, polyhydric alcohols, and unsaturated dicarboxylic acids that I react with this mixture of glycols and oligomers to produce the unsaturated resins of my invention are old in the art.

The dicarboxylic acids which are either saturated or only aromatically unsaturated include:
succinic acid
adipic acid
suberic acid
azelaic acid
sebacic acid
phthalic acid
isophthalic acid
terephthalic acid
tetrachlorophthalic acid
hexachloroendomethylenetetrahydrophthalic acid
and the like. The anhydrides of these acids, where the anhydrides exist are, of course, embraced since the polyesters obtained therefrom are the same. Furthermore, for purposes of the present invention, the aromatic nuclei of such acids as phthalic acid are generally regarded as saturated since the double bonds do not react by addition, as do ethylenic groups in the cross linking reactions of thermosetting polyesters. Therefore, wherever the term "saturated dicarboxylic acid" is utilized, it is to be understood that such term includes the aromatically unsaturated dicarboxylic acids.

The polyhydric alcohols (glycols) include:
ethylene glycol
diethylene glycol
triethylene glycol
polyethylene glycol
propylene glycol
dipropylene glycol
polypropylene glycol
glycerol
neopentyl glycol
pentaerythritol
trimethylol propane
trimethylol ethane
1,3 butylene glycol
1,4 butylene glycol and the like The ethylenically unsaturated dicarboxylic acids include such acids as:
maleic acid
fumaric acid
aconitic acid
mesaconic acid
citraconic acid
itaconic acid
and halo and alkyl derivatives of such acids and the like; the preferred acid being maleic acid. The anhydrides of these acids, where the anhydrides exist are, of course, embraced since the polyesters obtained therefrom are essentially the same whether the acid or anhydride is employed.

The amount of each material charged to the reactor, if employed, based on the parts by weight is as follows:

| Ingredients | Parts by Weight Range |
|---|---|
| Oligomer-Glycol Mixture | 20–75 |
| Saturated Dicarboxylic Acids | 2–35 |
| Glycols | 5–15 |
| Ethylenically Unsaturated Dicarboxylic Acids | 15–40 |

If desired, ethylenically unsaturated monomers (vinyl monomers) can be incorporated after the polyester is formed.

Examples of these vinyl monomers are:
styrene
halogenated styrenes
vinyl toluene
divinyl benzene
octyl acrylate
octyl methacrylate
diallyl phthalate
and the like.

The proportional amounts of the various materials charged is governed by the properties required for the intended use of the final resin. Such uses include, among others, hand lay-up, spray-up, bulk molding compound, sheet molding compound, and the like.

The following examples further illustrate my invention.

EXAMPLE I

I charged the following ingredients to a reactor.

| Ingredients | Mole |
|---|---|
| Oligomer-glycol mixture having a hydroxyl number of 284 | 0.864 |
| Dipropylene Glycol | 0.282 |
| Isophthalic Acid | 0.091 |

The charge was heated at a temperature of 204° C. for a period of time of 2 hours. I then charged 1.0 mole of maleic anhydride to the reactor and continued the reaction for 5 hours at a temperature of 213° C. The acid number at the end of the cook was 19.6.

Styrene was added to the resulting material to give an initial viscosity of 395 cps. After 22 days the viscosity was 424 cps. The change in viscosity was 1.3 cps per day.

EXAMPLE II

I charged the following ingredients to a reactor:

| Ingredients | Mols |
|---|---|
| Oligomer-glycol mixture of | |

| Ingredients | Mols |
| --- | --- |
| Example I | 0.864 |
| Dipropylene Glycol | 0.282 |
| Isophthalic Acid | 0.091 |
| Maleic Anhydride | 1.0 |

The oligomer-glycol mixture had the same composition as the mixture I used in Example I.

The charge was heated at a temperature of 213° C., for a period of time of 4¾ hours. The acid number at the end of the cook was 19.7.

Styrene was added to the resulting material to give an initial viscosity of 370 cps. After 22 days the viscosity was 832 cps. The change in viscosity was 17 cps per day.

The only difference between Examples I and II is the two stage cooking of Example I. Yet, the stabilization of the viscosity in Example I is noticeably significant. Stabilization of viscosity in the two stage cook is very advantageous for storage and shelf life.

EXAMPLE III

I charged the following ingredients to a reactor:

| Ingredients | Mols |
| --- | --- |
| Oligomer-glycol mixture of Example I | 0.495 |
| Propylene glycol | 0.210 |
| Dibutyl tin oxide catalyst | 30.2 grams |

I cooked the charge in a closed reactor for 2 hours at 450° F. and then cooled it to 200° F.

Next, I added the following second charge to the reactor:

| Ingredients | Mols |
| --- | --- |
| Propylene glycol | 0.974 |
| Phthalic anhydride | 0.348 |
| Maleic anhydride | 0.652 |

My second cook then lasted 5½ hours at 415° F. until the reaction had an acid number of 26.9. I cooled the reaction product to 350° F. and slowly added 46.45 pounds of styrene containing 11.4 grams of toluhydroquinone. The final resin had an acid number of 17.1 and a viscosity of 626 cps.

This example demonstrates the preparation of an unsaturated polyester wherein the mixture of glycols and oligomers is transesterified in the presence of an additional glycol and then reacted with an unsaturated acid and a saturated acid.

EXAMPLE IV

A typical analysis of the mixture of glycols and oligomers I employ in this invention is:

| Composition | Weight Percent |
| --- | --- |
| Ethylene glycol | 12.5 |
| Diethylene glycol | 5.1 |
| Triethylene glycol | 0.9 |
| Ethylene glycol monomer | 33.5 |
| Diethylene glycol monomer | 1.5 |
| Mixed monomers | 10.7 |
| Oligomers | 35.8 |
| hydroxyl number | 481 |

The apparent molecular weight of this mixture or any other glycol-oligomer mixture I employ can be calculated by the following formula:

$$\text{molecular weight} = \frac{1.222 \times 10^5}{\text{hydroxyl number}}.$$

To produce a thermosetting, unsaturated polyester resin from this typical mixture, I would react about 56 parts by weight of it with about 5 parts by weight of dipropylene glycol, about 4 parts by weight of propylene glycol, and about 15 parts by weight of isophthalic acid. Twenty parts by weight of maleic acid then would be added during the second cook.

The amount of glycols and dicarboxylic acids added to the first cook depends upon the hydroxyl number of the waste stream (mixture of oligomers and glycols) employed, while holding the amount of unsaturated dicarboxylic acid constant. This insures consistency of product properties in spite of variations in the composition of the waste stream glycol from lot to lot.

To illustrate, if the waste stream had a hydroxyl number of 600, about 49 parts by weight of it would be reacted with about 5.6 parts by weight of dipropylene glycol, about 4.4 parts by weight of propylene glycol, and about 20 parts by weight of isophthalic acid. Twenty-one parts by weight of maleic anhydride then would be added during the second cook.

EXAMPLE V

An unsaturated, thermosetting polyester resin was prepared according to the procedures of Example I from a mixture of oligomers and glycols wherein the mixture had a hydroxyl number of 529. Castings of this resin cut with 30 weight percent styrene were prepared.

The castings were tested for flexural modulus, flexural strength, tensile strength, tensile modulus, elongation at break, and heat distortion temperature.

The same procedure was carried out with a commercially available polyester molding composition. These castings also were tested for the above properties. In these examples the tests were carried out according to the indicated ASTM Specification.

| | Polyester of Example IV | Commercially Available Polyester |
| --- | --- | --- |
| Flexural Strength (psi × 10³) (ASTM 0790) | 22.38 | 14.50 |
| Flexural Modulus (psi × 10⁶) (ASTM 0790) | 0.589 | 0.666 |
| Tensile Strength (psi × 10³) (ASTM D638) | 8.56 | 8.70 |
| Tensile Modulus (psi × 10⁶) (ASTM D638) | 0.537 | 0.614 |
| Elongation at Break (%) | 1.9 | 1.8 |
| Heat Distortion Temperature (°F.) | 176 | 160 |

Thus the polyesters produced by the process of this invention have physical properties comparable, or in many cases superior to, those of commercially available polyesters. Yet they were produced from waste streams from a polyester process. Producing a useful polyester from these waste streams renders this invention an ecological and economical advantage.

I intend to include modifications and variations within the scope and spirit of this invention.

I claim:

1. A method for producing an unsaturated polyester resin from a mixture of glycols and oligomers, said mixture having a hydroxyl number of about 250 to 1000 and comprising a waste stream from the production of polyethylene terephthalate, where said glycols in said mixture are selected from the group consisting of ethylene glycol, diethylene glycol and diesters of terephthalic acid with ethylene glycol and/or diethylene glycol and where said oligomers in said mixture are low molecular weight polyesters of terephthalic acid with ethylene glycol or with both ethylene glycol and diethylene glycol which contain about two to four terephthalic acid residues per molecular, said method comprising the steps of:

(a) forming a blend of said mixture with a polyhydric alcohol selected from the group consisting of ethylene glycol, diethylene glycol, triethylene glycol, polyethylene glycol, propylene glycol, dipropylene glycol, polypropylene glycol, glycerol, neopentyl glycol, pentaerythritol, trimethylol propane, trimethylol ethane, 1,3-butylene glycol and 1,4-butylene glycol;

(b) transesterifying said blend at a temperature of 170° C. to 235° C. and a pressure of up to 60 psi for 2 to 24 hours;

(c) adding an ethylenically unsaturated dicarboxylic acid to the transesterified blend; and (d) further reacting the transesterified blend containing said added acid to reduce the acid number below about 35.

2. The method of claim 1 in which in step (a) a saturated dicarboxylic acid is added to said blend and in step (b) the acid number of the transesterified blend is reduced to less than half that of said blend.

3. The method of claim 1 in which said blend formed in step (a) contains a catalyst.

4. The method of claim 1 in which a saturated acid is added to the transesterified blend in step (c).

5. The method of claim 1 in which a polyhydric alcohol selected from the group consisting of diethylene glycol, triethylene glycol, polyethylene glycol, propylene glycol, dipropylene glycol, polypropylene glycol, glycerol, neopentyl glycol, pentaerythritol, trimethylol propane, trimethylol ethane, 1,3 butylene glycol, and 1,4 butylene glycol is added to the transesterified blend in step (c).

* * * * *